United States Patent [19]
Barrett

[11] 4,373,402
[45] Feb. 15, 1983

[54] METHOD AND APPARATUS FOR MEASURING CABLE TENSION IN A PARKING BRAKE ASSEMBLY

[75] Inventor: Gary L. Barrett, Union Lake, Mich.

[73] Assignee: GSE, Inc., Farmington Hills, Mich.

[21] Appl. No.: 242,095

[22] Filed: Mar. 9, 1981

[51] Int. Cl.³ ............................ G01L 5/10; G01L 5/28
[52] U.S. Cl. .................................... 73/862.39; 73/132; 73/862.54
[58] Field of Search ............ 73/121, 129, 132, 862.39, 73/862.42, 862.54

[56] References Cited

U.S. PATENT DOCUMENTS 1,498,289  6/1924  Parsley .......................... 73/862.39 X
2,983,140  5/1961  Crane ............................. 73/862.39
3,943,761  3/1976  Shoberg et al. .................. 73/862.48

Primary Examiner—Charles A. Ruehl
Attorney, Agent, or Firm—Krass, Young & Schivley

[57] ABSTRACT

Tension in a cable of a parking brake assembly is measured by way of a force measuring transducer device which is removably attachable to the lever arm bracket of the assembly located in the cabin of the automobile. The lever arm is lifted and the transducer device is positioned such that the arm presses against the load receiving surface of the transducer, such pressure being a function of the cable tension. Preferably, the transducer includes at least one flexure element connected to the load receiving surface operative to convert the force applied by the lever arm to electrical signals as a function thereof. The transducer device incorporates a retractable pin which engages an opening in the mounting bracket for the lever arm. The transducer is thus wedged between portions of the bracket and a pawl on the lever arm in a predetermined orientation such that the forces exerted by the pawl are applied generally perpendicularly to the flexure element. The invention finds particular utility in the manufacture of automobiles where the parking brake cable is not accessible underneath the body of the car.

14 Claims, 6 Drawing Figures

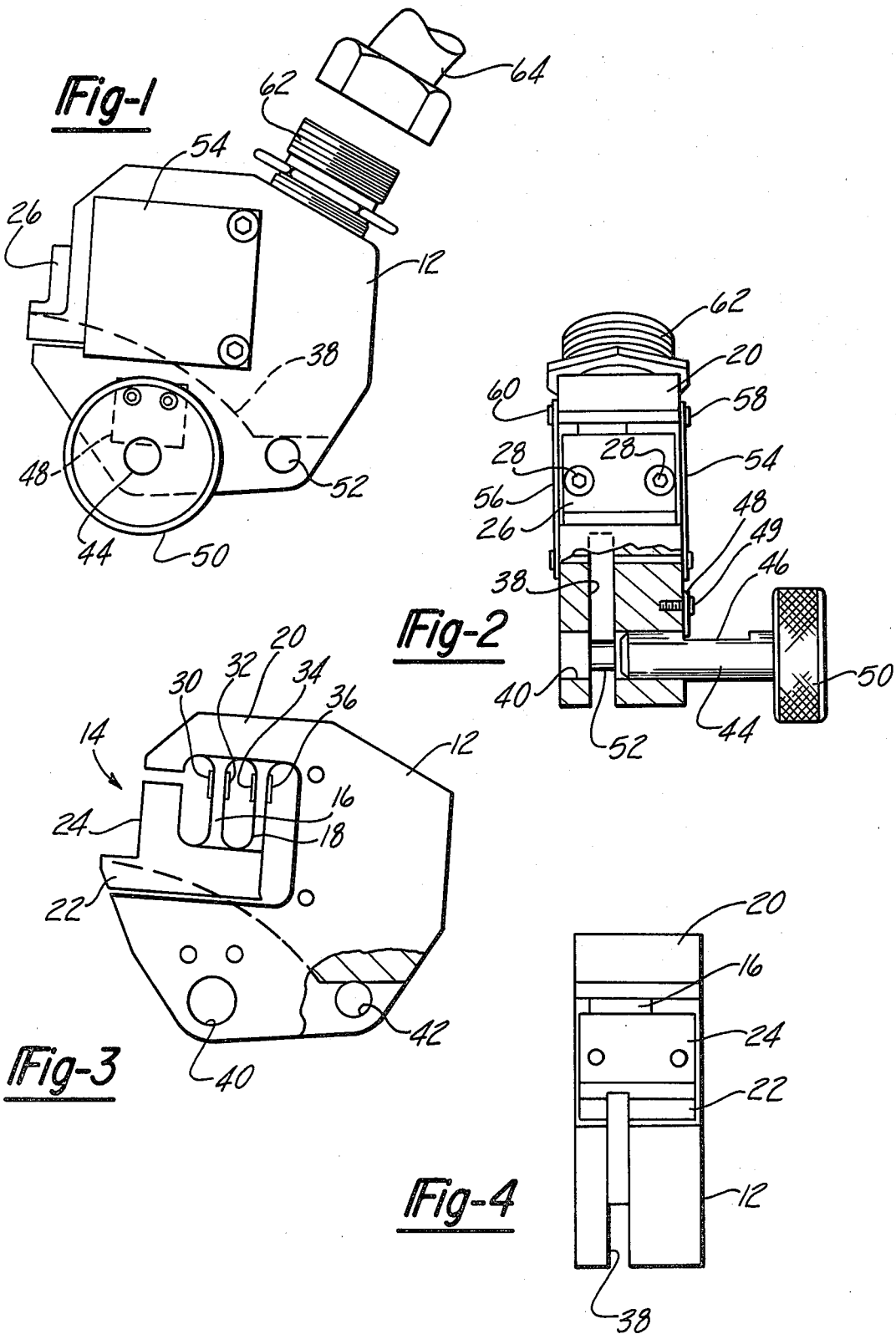

METHOD AND APPARATUS FOR MEASURING CABLE TENSION IN A PARKING BRAKE ASSEMBLY

CROSS REFERENCE TO RELATED APPLICATIONS

This application is related to concurrently filed U.S. Ser. No. 241,912 filed Mar. 9, 1981, to Barrett, entitled "Apparatus For Measuring Parking Brake Activating Forces", having the same assignee as the present invention.

BACKGROUND OF THE INVENTION

This invention relates to force measuring transducers. More particularly, it involves a method and apparatus for measuring the tension in a cable of a parking brake assembly.

Adjustment of the cable actuator in a mechanical parking brake assembly is a critical factor in the manufacture of automobiles. The tension on the cable must be properly adjusted in order for the brakes to be sufficiently engaged upon actuation of the setting device in the cabin of the automobile. In the past the parking brake cable was often exposed underneath the body of the car such that the tension in the cable could be conveniently measured at that location. U.S. Pat. No. 3,943,761 entitled "Cable Tension Tester and Control System" has been used with extremely satisfactory results where such access to the cable is available. However, in many of the newer car models the parking brake cable is run through a conduit underneath the car to protect it from corrosion and other road abuse. Unfortunately, this prevents access to the cable in later stages of assembly of the car so that conventional cable tension measurement techniques cannot be used.

SUMMARY OF THE INVENTION

The present invention solves the above-noted problem by way of a force measuring transducer device which cooperates with the parking brake setting mechanism in the cabin of the automobile to measure the tension on the cable. It finds particular utility with parking brake assemblies using lever arm type setting devices. According to the method of the invention, the lever arm is raised to a given position and the force measuring transducer is inserted between the lever arm and a fixed surface such as the mounting bracket for the lever arm. When the parking brake lever arm is released it presses against a load receiving surface of the transducer, the amount of pressure being a function of the tension in the cable. The cable tension may then be adjusted while monitoring the output of the transducer device until it falls within predetermined limits.

In the preferred embodiment, the transducer device takes the form of a load cell formed from a machined block of relatively rigid material. A plurality of flexure beams are formed in the block and are connected to the load receiving surface. Variable resistance strain gauges on the beams provide an electrical output as a function of the force applied to the load receiving surface. A retractable retainer pin is provided for engaging an opening in the mounting bracket of the parking brake assembly for thereby affixing the transducer at the appropriate location and orientation during the testing procedure.

Thus, the cable tension can be easily measured and adjusted, if necessary, within the cabin of the automobile which is readily accessible even though the cable is not exposed underneath the body of the car.

BRIEF DESCRIPTION OF THE DRAWINGS

These and other objects and advantages of the present invention will become apparent upon reading the following specification and by reference to the drawings in which:

FIG. 1 is a front elevation view of the force transducer device made in accordance with the preferred embodiment;

FIG. 2 is a side view with parts cut away of the transducer device shown in FIG. 1;

FIG. 3 is a front elevation view of the load cell portion of the transducer device;

FIG. 4 is a side elevation view of the load cell shown in FIG. 3;

DESCRIPTION OF THE PREFERRED EMBODIMENT

Figure 5:
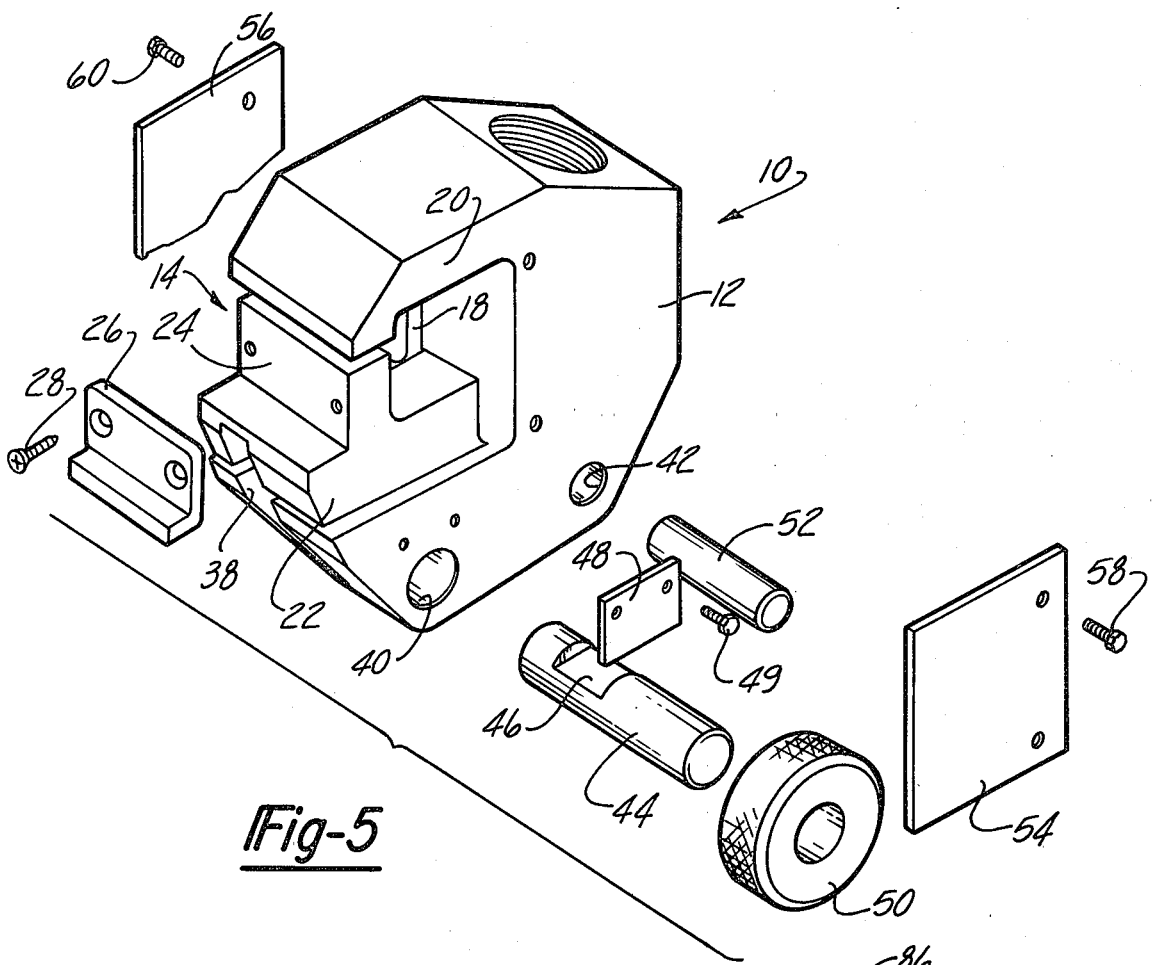
FIG. 5 is an exploded perspective view of the force transducer device.

Referring especially to FIGS. 1–5, the force transducer device 10 takes the form of a load cell constructred of a machine block 12 of high grade tool steel such as No. 4140. The load sensing portion (generally designated by the numeral 14) is formed in block 12 in such a way so as to increase its sensitivity to applied forces. A series of two generally vertically extending flexure beams 16 and 18 are recessed within the confines of the outer surfaces of block 12. As can be seen most clearly in FIG. 3, the upper portions of beams 16 and 18 are hinged about the upper lip 20 of block 12. Lower portions of beams 16 and 18 are integrally connected to a free floating foot portion 22. Foot portion 22 terminates in a load receiving surface 24 which is adapted to receive an L-shaped insert 26. Insert 26 is attached by way of screws 28 and serves as a replaceable wear plate which can be easily replaced after extended usage.

Thus, it can be seen that foot 22 serves as a load transmitting portion that creates strain in beams 16 and 18 whenever a force is applied to the load receiving surface 24. Foot 22 is not connected to block 12 except for its hinge points to beams 16, 18 and therefore increases the transfer efficiency of the forces from the applied load to the beams. The geometry of the load sensing portion 14 is constructed so as to be most sensitive to forces applied generally perpendicularly to the vertical load receiving surface 24 of foot 22. Such forces cause the left sides of beams 16 and 18 to undergo tension while the right sides of beams 16 and 18 undergo compression. Variable resistance strain gauges 30, 32, 34 and 36 provide electrical output signals as a function of the strain developed in beams 16 and 18. Strain gauges 30–36 may be connected into a typical Wheatstone bridge circuit such that the output of the bridge is a function of the applied forces to the load cell.

Transducer device 10 includes a generally arcuate shaped cutaway portion 38 extending parallel to the major surfaces of block 12. Cutaway 38 is arranged to conform to the mounting bracket of the parking brake assembly as will become apparent later herein. Block 12 includes two transversely extending passageways 40 and 42. Passageway 40 is adapted to receive a retractable retaining pin 44 as can be seen most clearly in FIGS. 2 and 5. Pin 44 includes a groove 46 in which a retaining plate 48 is adapted to ride. Plate 48 is screwed to block 12 by screws 49. One end of pin 44 includes a knob 50. As should be apparent to one skilled in the art, plate 48 serves to restrict the reciprocating motion of pin 44 such that it can be pulled outwardly (as shown in FIG. 2) to a position wherein the opposite end of pin 44 does not protrude into cutaway 38. Full insertion of the pin 44 will traverse cutaway 38 and pass completely through passageway 40. A dowel 52 is press fit into opening 42; dowel 52 spanning the rearward portions of cutaway 38.

Figure 6:
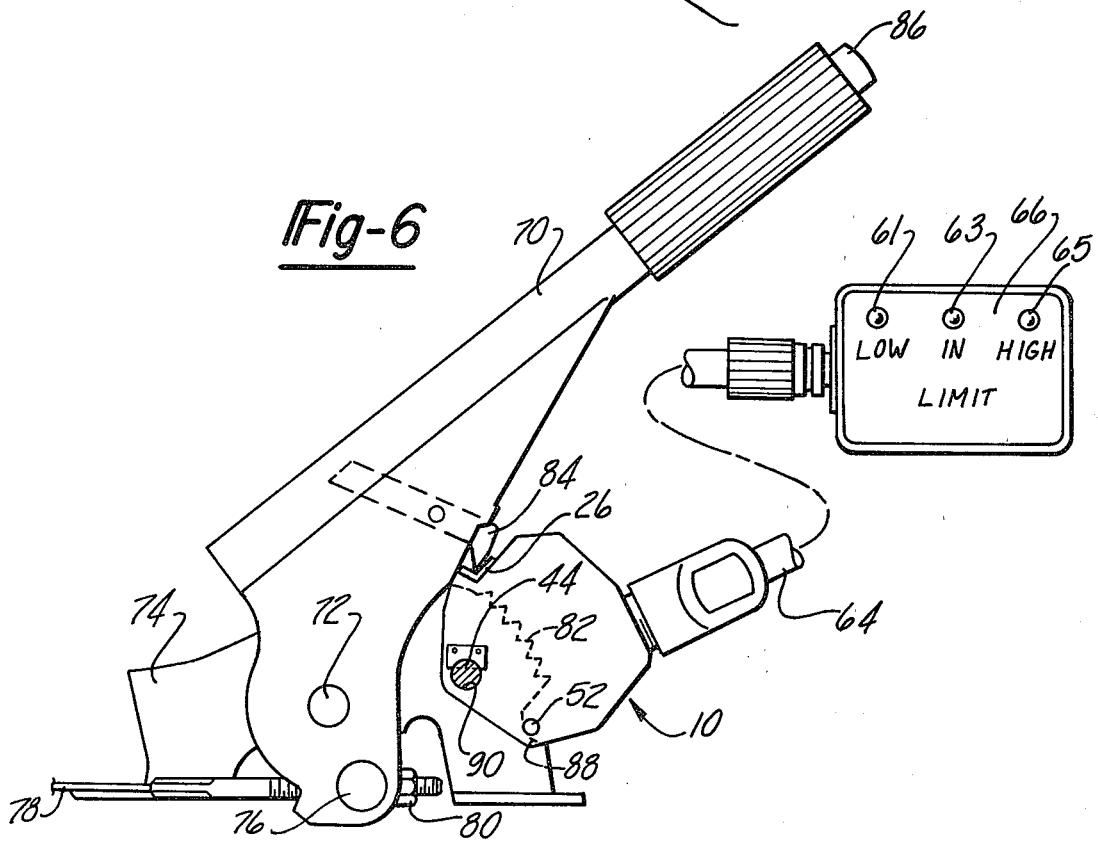
FIG. 6 is a view showing the force transducer device during the testing procedure according to the method of this invention.

The transducer device 10 is completed by way of a pair of cover plates 54 and 56 which are affixed to block 12 by way of screws 58 and 60, respectively, attached to only one side of load sensing portion 14. Note that the cover plates 54, 56 are mounted on block 12 such that they do not bind or prevent the relative movement of the load sensing portion 14. Electrical connection to the strain gauges 30-36 are made by way of wires (not shown) which terminate in a connector member 62. A cable 64 is adapted to mate with connector 62 to couple the electrical output of the device 10 to electronic logic and control circuitry 66 (FIG. 6). Circuitry 66 may employ conventional peak and hold devices coupled to the output of the strain gauge bridge circuit. The contents of the peak and hold devices are compared to preselected high and low limits for the cable tension. Internal logic serves to light one of the indicating lamps 61, 63 or 65 depending on the comparison. An example of such logic and control circuitry is found in GSE Model 535, "Single-Spindle Torque Monitor", made by the assignee of this invention.

The transducer device 10 finds particular utility in measuring cable tension in parking brake assemblies similar to that shown in FIG. 6. Such assemblies typically include a lever arm 70 pivoted about a point 72 passing through a mounting bracket 74. The lower end of lever arm 70 is connected by way of conventional link 76 to a parking brake cable 78. The end of parking brake cable 78 includes a threaded portion onto which a nut 80 is provided. The tension on cable 78 is adjusted by tightening or loosening nut 80. The parking brake assembly may include a ratchet assembly provided by a toothed surface 82 on bracket 74 and a pawl 84 pivotally mounted on lever arm 70. In ordinary use the lever arm 70 is raised until the user exerts sufficient tension on cable 78 to actuate the parking brakes. The pawl 84 engages a particular tooth on surface 82 to hold the tension on the cable. To release the parking brake a button 86 is pushed to disengage the pawl 84 from the tooth such that lever arm 70 may be lowered to its starting position.

According to the method of this invention, the lever arm 70 is raised to a position at which pawl 84 passes beyond the last tooth of bracket surface 82. Transducer device 10 is then secured to bracket 74 as shown in FIG. 6. Dowel 52 is adapted to rest in a stepped portion 88 of the bracket 74. The toothed surface 82 passes through the cutaway 38 of device 10 such that it straddles opposite sides of the bracket 74. The retaining pin 44 is inserted through an opening 90 in bracket 74 to hold the transducer device 10 securely in position. The location of dowel 52 and retaining pin 44 is arranged such that the load receiving surface 24 behind insert 26 is generally perpendicular to the force exerted by pawl 84 of the lever arm 70.

After device 10 has been securely mounted on bracket 74 the user may release his grip on the lever arm 70 to allow the pawl 84 to press against insert 26. The force applied by pawl 84 is a direct function of the amount of tension on cable 78. The force applied by pawl 84 to transducer 10 causes the beams 16 and 18 to undergo a certain amount of flexure which is sensed by strain gauges 30-36. If the output of the strain gauges falls below a preset limit, circuitry 66 will provide an indication thereof by lighting LOW lamp 61. Conversely, if too much tension has been detected, circuitry 66 will energize HIGH lamp 65. If the cable tension is within range, the IN lamp 63 will be energized. If the cable tension is above or below limits, nut 80 may be tightened or loosened in order to adjust the cable tension and place it within limits. This may be accomplished by way of conventional automatic air wrench. Provision can be made to automatically control the amount and direction of wrench operation as a function of the output of the transducer device 10. For example, circuitry 66 can include a control output for rotating the torque wrench in a clockwise direction to tighten nut 80 to thereby increase the cable tension until such time as the output of transducer 10 falls within the predetermined limits. Conversely, the torque wrench may be rotated counter-clockwise to loosen the nut when cable tension is too high.

In view of the foregoing, one skilled in the art will now appreciate that the present invention provides not only a novel but extremely efficient method of measuring and adjusting cable tension in a parking brake assembly. According to the teachings of the invention, all measurements and adjustments can be made within the cabin of the automobile which is always accessible regardless of the stage of the manufacturing process. Thus, the cable tension can be adjusted on-line or tested afterwards by the quality control department. In any event, the testing procedure is simple. The user need only to lift up on the lever arm to a given position, mount the transducer device so that is is effectively wedged between the lever arm and a fixed supporting surface, release the lever arm, monitor the output of the transducer device and make the necessary cable adjustments, if required.

Other objects and advantages of this invention will become apparent to one skilled in the art upon a study of the drawings, specification and following claims.

I claim:

1. Apparatus for measuring the tension in a cable of a parking brake assembly having a lever arm pivotally connected to a mounting bracket, said apparatus comprising:
   a force measuring transducer device including a load receiving surface;
   at least one flexure element connected to the load receiving surface;
   means on the flexure element for converting strain developed therein to an electrical signal as a function thereof; and
   mounting means for securing the device on the bracket of the parking brake assembly such that the lever arm engages the load receiving surface when the lever arm has been raised to a given position;
   whereby the tension on the cable may be adjusted until the output of the device indicates that the appropriate amount of tension on the cable has been obtained, the force applied by the lever arm to the load receiving surface of the transducer device being a function of the cable tension.

2. The apparatus of claim 1 wherein said mounting means includes a retaining pin arranged to pass through an opening in the bracket of the parking brake assembly to thereby secure the device thereto.

3. The apparatus of claim 2 wherein the mounting means further includes a member for resting on a supporting surface of the bracket and cooperating with the retaining pin to orient the device such that the load receiving surface comes into contact with the lever arm.

4. The apparatus of claim 1 wherein said device comprises a load cell formed from a block having a plurality of beams formed in the interior thereof serving as said flexure elements.

5. The apparatus of claim 4 wherein said beams extend generally parallel to each other and are hinged at their top portions to the block, with bottom portions of the beams being connected to a load transferring member free from other connection to the block, said load transferring member having a surface generally parallel to the beams to thereby provide said load receiving surface.

6. The apparatus of claim 5 wherein said mounting means is arranged such that the load receiving surface is generally perpendicular to the applied force from the lever arm.

7. The apparatus of claim 6 wherein interior portions of the block include an arcuate cutaway adapted to receive portions of the mounting bracket such that the transducer device straddles said bracket.

8. The apparatus of claim 7 wherein said load receiving surface is adapted to receive an insert for receiving a pawl on the lever arm.

9. The apparatus of claim 7 wherein said mounting means includes a retaining pin for passing through openings in said bracket, and means for restricting the movement of the pin such that it may be retracted from the cutaway to allow for removal and insertion of the transducer device.

10. A method of adjusting the tension on a cable in a parking brake assembly having a lever arm pivotally mounted on a bracket in the cabin of an automobile, said method comprising:
raising the lever arm to a given position;
inserting a force measuring transducer on the bracket;
releasing the lever arm such that a portion thereof comes into contact with the force measuring transducer; and
adjusting the tension on the cable until the output of the transducer is within predetermined limits.

11. A method of measuring the tension on a cable in a parking brake assembly having a lever arm pivotally mounted on a bracket and latching means for selectively holding the lever arm in an adjusted position, said method comprising:
releasing the latching means and raising the lever arm to a given position;
inserting a force measuring transducer device on the bracket;
releasing the lever arm so that it comes into contact with the transducer device; and
converting the force applied by the lever arm to electrical signals by way of flexure elements in the transducer device to provide an output which is a function of the tension on the cable.

12. The method of claim 11 wherein the transducer device is inserted so that the force from the lever arm is applied generally perpendicularly to the flexure elements.

13. The method of claim 11 wherein said latching means comprises a pawl on the lever arm adapted to engage a toothed surface on the bracket and wherein the pawl contacts the transducer device when the lever arm is released.

14. The method of claim 13 wherein strain gauges on the flexure elements generate said electrical signals.

* * * * *